Nov. 18, 1969  H. F. RUSSELL  3,478,380
AUTOMATIC MEAT CLEANING APPARATUS
Filed June 5, 1968  5 Sheets-Sheet 1
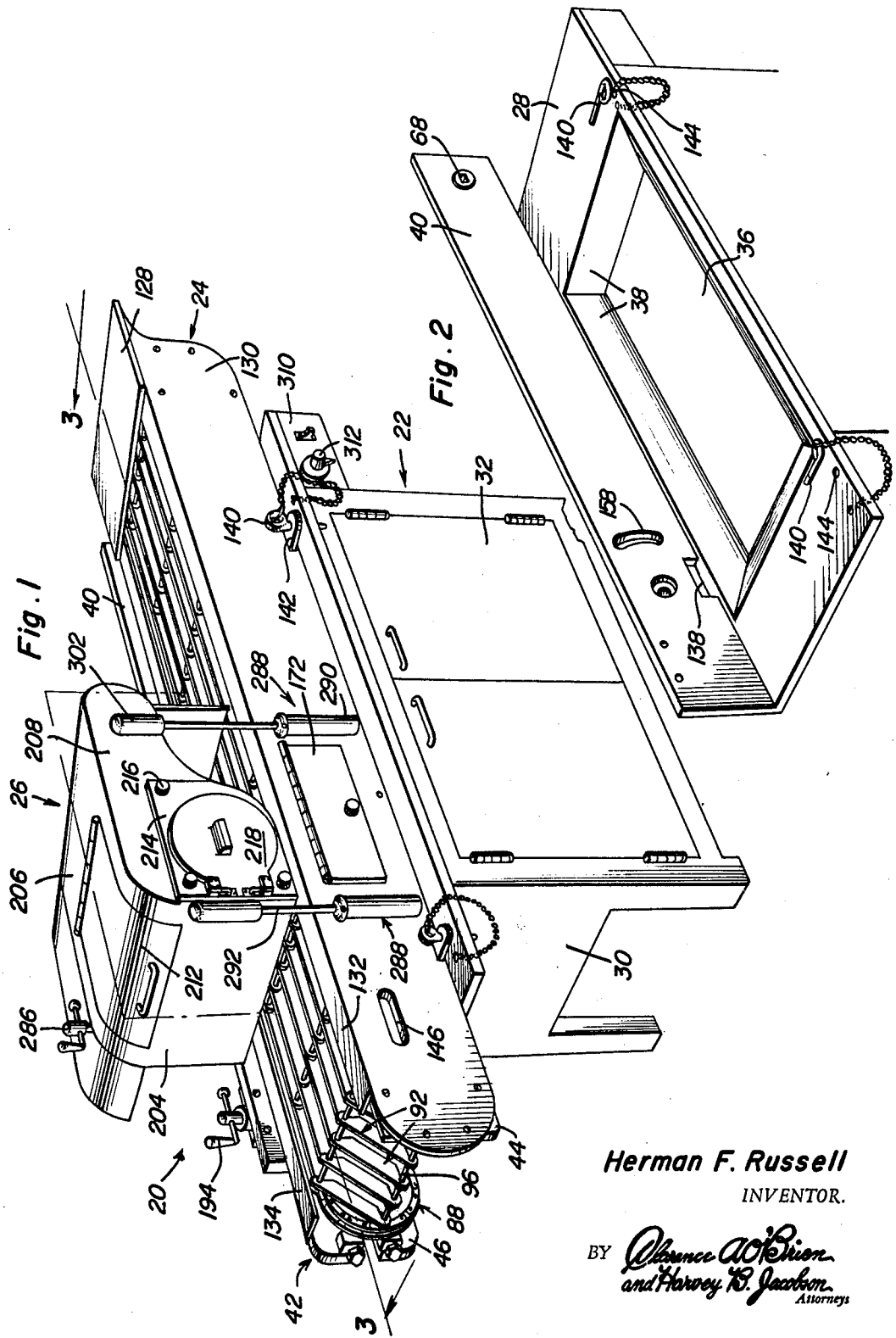
Herman F. Russell
INVENTOR.

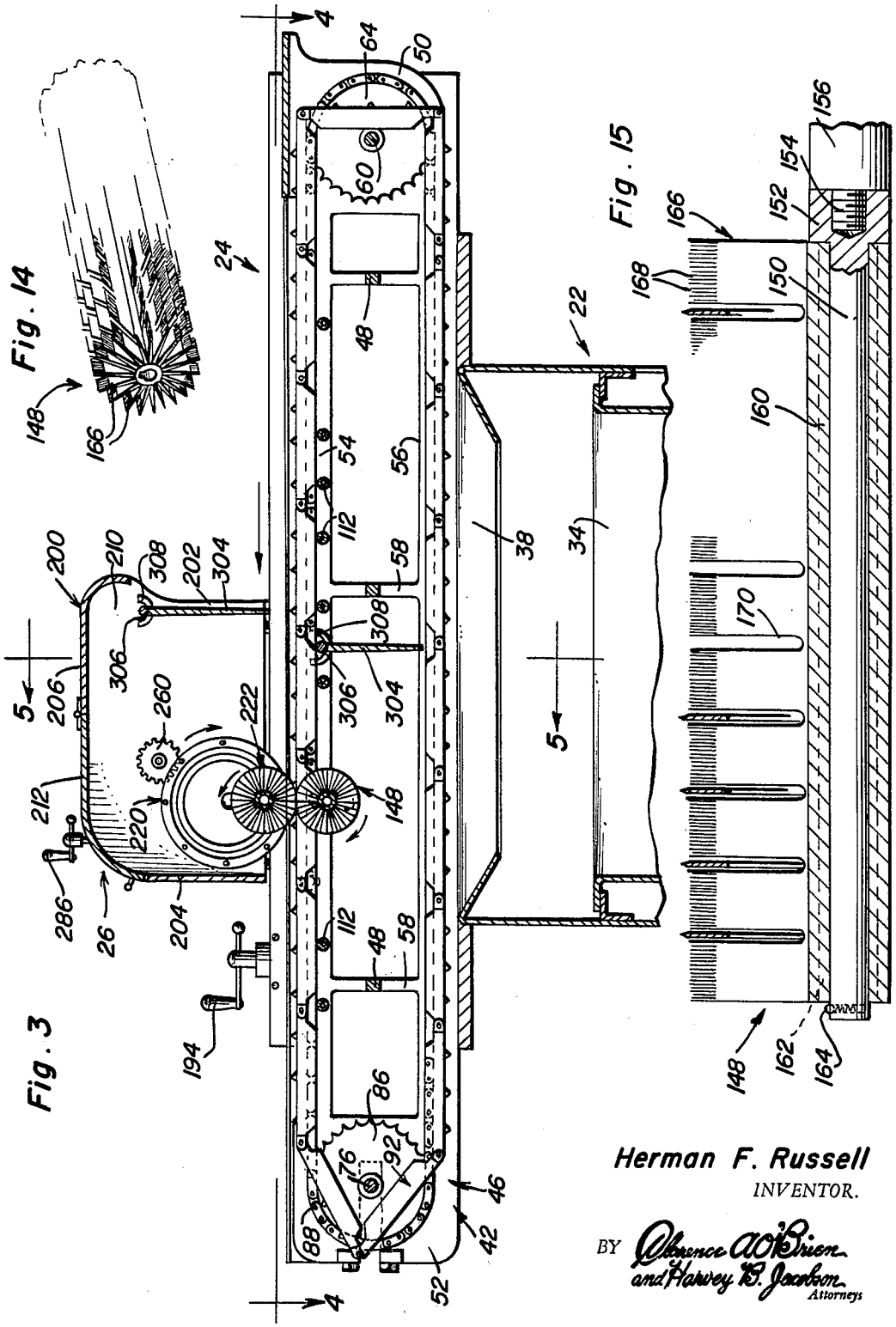

Nov. 18, 1969  H. F. RUSSELL  3,478,380
AUTOMATIC MEAT CLEANING APPARATUS
Filed June 5, 1968  5 Sheets-Sheet 3
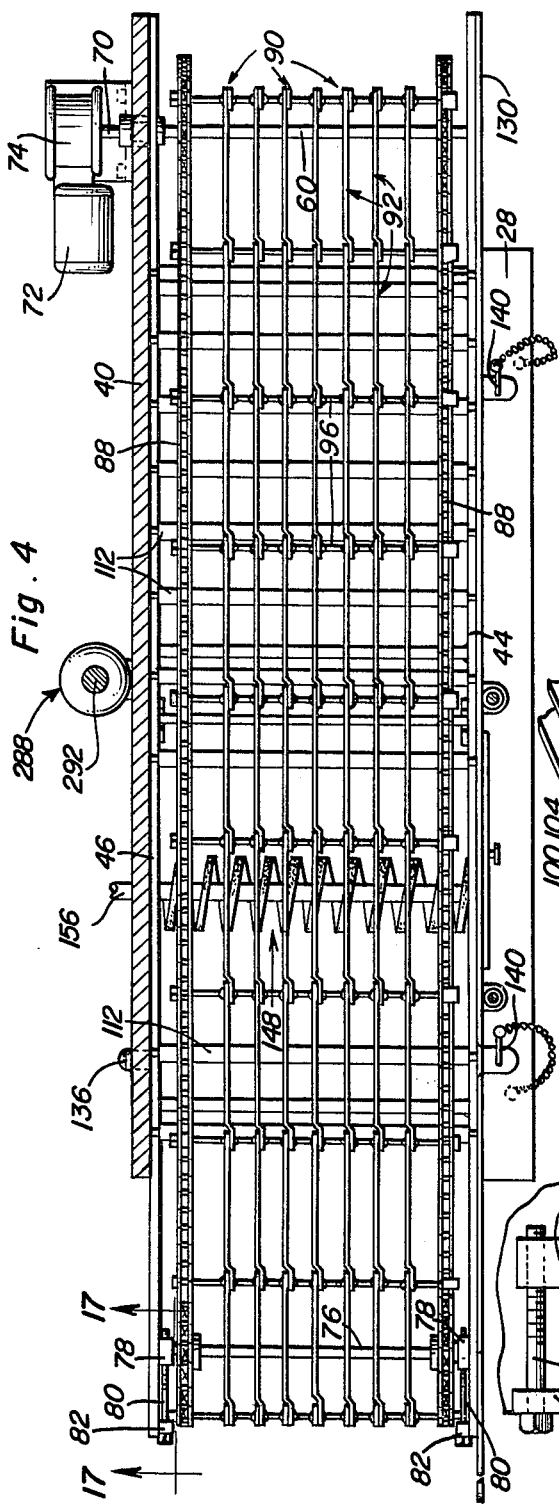
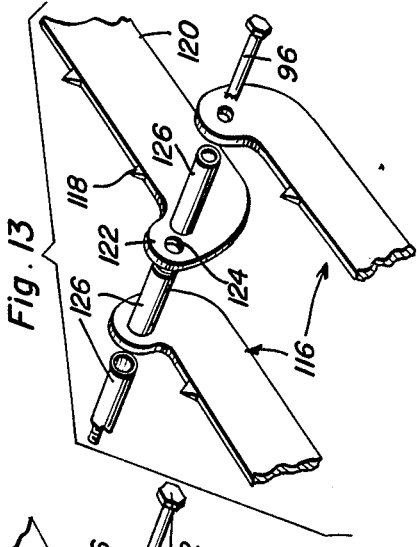
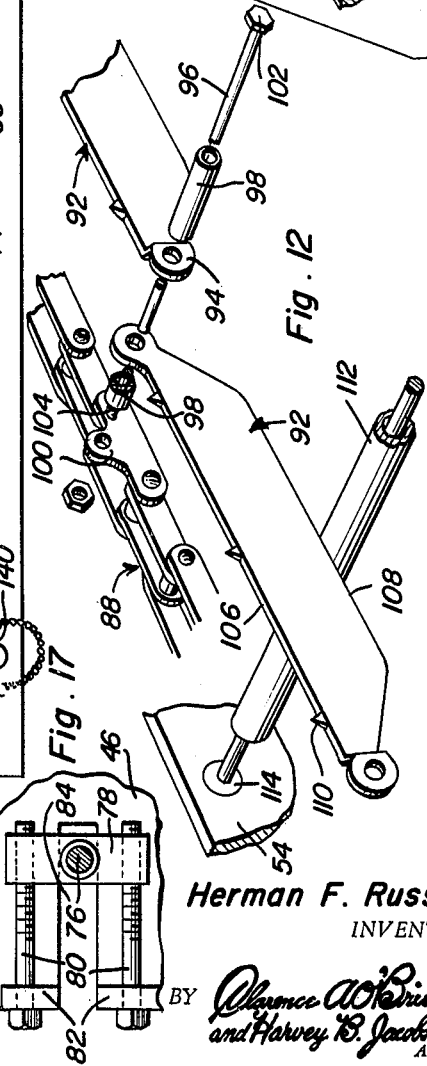
Herman F. Russell
INVENTOR.

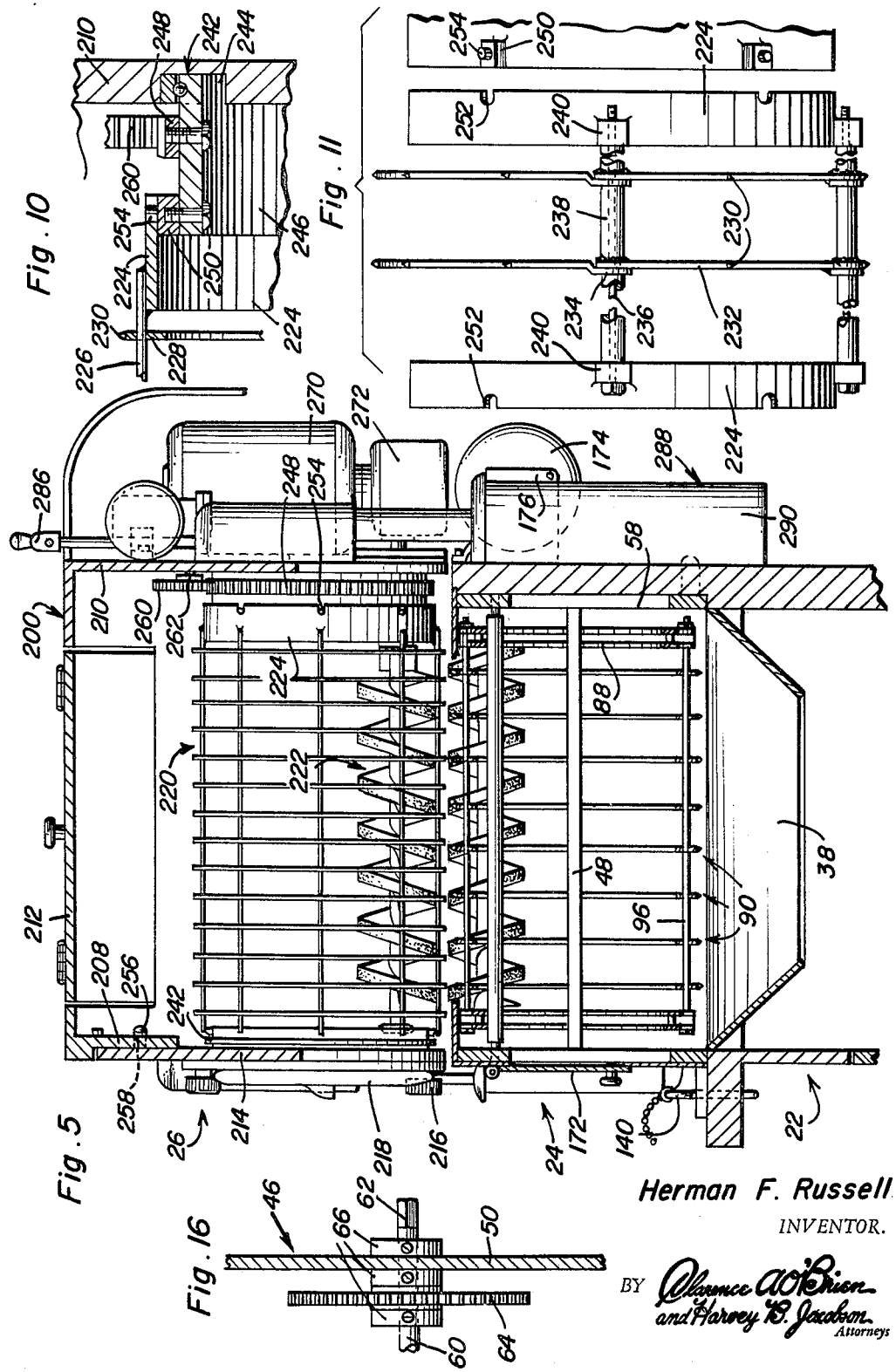

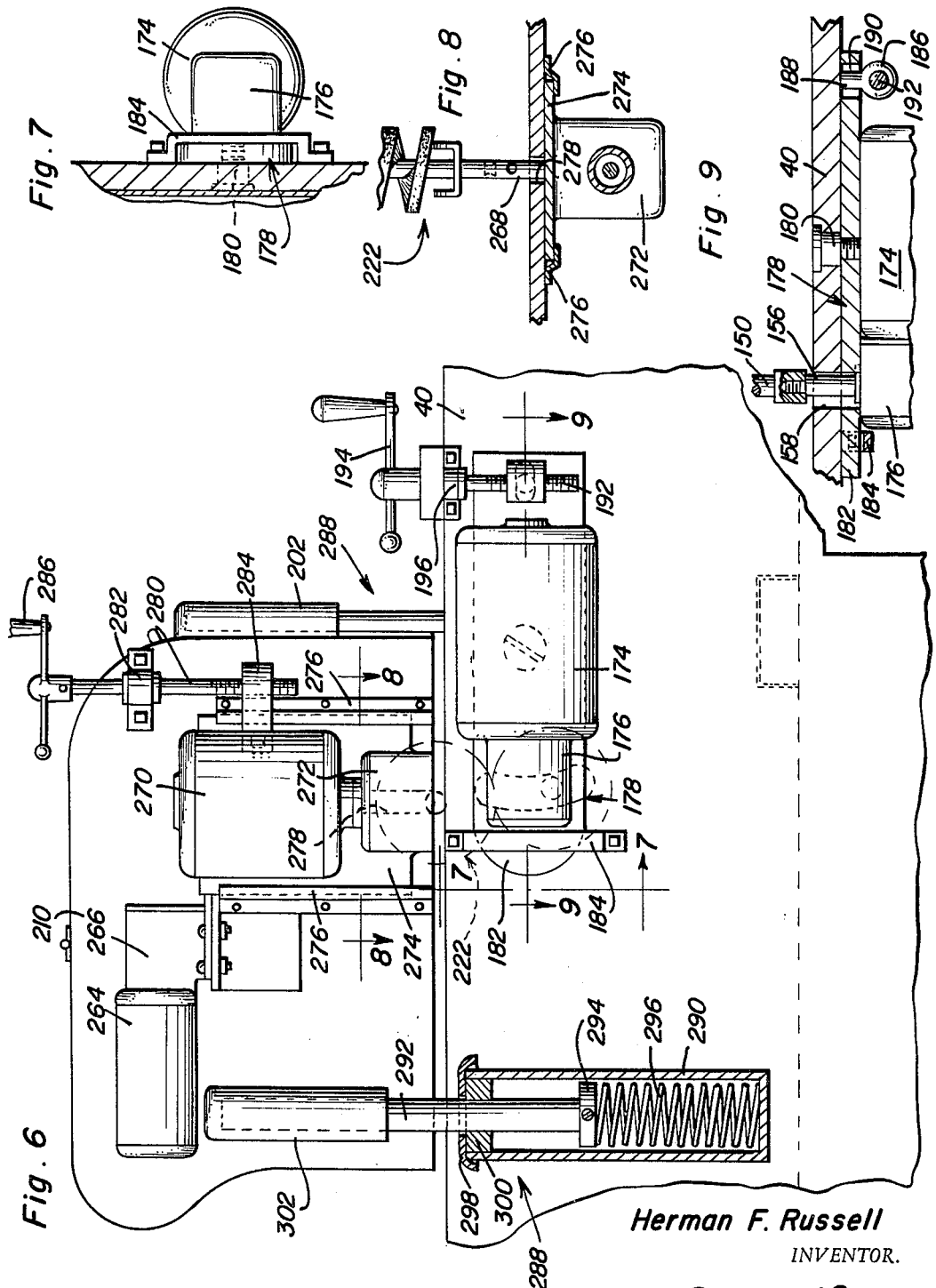

United States Patent Office 3,478,380
Patented Nov. 18, 1969

3,478,380
AUTOMATIC MEAT CLEANING APPARATUS
Herman F. Russell, 13900 Cherrylawn St.,
Detroit, Mich. 48238
Continuation-in-part of application Ser. No. 704,971,
Jan. 15, 1968. This application June 5, 1968, Ser.
No. 734,729
Int. Cl. A22c 17/08
U.S. Cl. 15—3.17                 15 Claims

ABSTRACT OF THE DISCLOSURE

A meat cleaning machine including an endless meat carrying open network blade-type conveyor and an open network blade-type roller overlying a portion of said conveyor and operable in a coordinated manner therewith for moving a cut of meat by a pair of opposed brushes, one mounted within the conveyor and one within the roller. The brushes rotate in directions opposed to the direction of travel of the meat for brushing engagement therewith. The roller unit is removably mounted on the conveyor unit for independent use of the conveyor unit, the conveyor unit itself being removably mounted on a support table for ease of cleaning.

---

This is a continuation-in-part of application Ser. No. 583,206, filed Sept. 30, 1966, and now Patent No. 3,389,414 for Automatic Meat Handling and Cleaning Machine. This is also a continuation-in-part of application Ser. No. 704,971, filed Jan. 15, 1968, for Meat Cleaning Apparatus which is a continuation-in-part of application Ser. No. 583,206, supra, and of abandoned applications Ser. Nos. 570,616 and 659,397, filed Aug. 5, 1966 and Aug. 9, 1967, respectively.

The instant invention generally relates to new and useful improvements in machines for automatically cleaning meat, and more particularly is concerned with a meat cleaning machine which incorporates an elongated meat gripping and moving conveyor operable both alone, in conjunction with an adjacent brush, for the cleaning of one face or side of a cut of meat, and in conjunction with a meat gripping roller and brush combination for the cleaning of opposed faces of a cut or slab of meat.

It is proposed by the instant invention to provide a meat cleaning machine or apparatus which is capable of handling cut meat, efficiently cleaning the severed or cut faces thereof and removing bone dust, marrow, meat particles and the like so as to present a clean saleable product. In doing so, the machine is adapted to handle both sections of meat, such as quarters wherein only a single face need be cleaned, and cuts or slabs of meat, regardless of the thickness thereof, wherein the cleaning of two opposed faces is required. The conveyor portion of the machine receives the meat and automatically moves the meat past the cleaning portion of the machine, the meat being positively gripped for movement along the cleaning path with the elongated nature of the conveyor and the positive carrying of the meat effected thereby particularly adapting the machine for use in high speed large volume operations.

Basically, the machine of the instant invention includes an elongated horizontal conveyor which receives and grips a cut of meat at one end thereof and moves the meat longitudinally therealong for passage between a counterweighted overhead meat gripping roller which cooperates with the conveyor in providing a firm grip on the meat and moving the meat past a pair of upper and lower rotating brushes which contact and clean the opposed faces of the meat. The gripping roller unit is removable for the cleaning of large cuts of meat, such as sections or the like, wherein only one face of the meat need be cleaned. The conveyor itself is removably mounted on a base or table which includes an enlarged scrap receiving container for receipt of the scraps brushed from the meat by the machine, such scraps being directed to the scrap tray or receptacle by a pair of deflectors suspended in the conveyor unit and the roller unit. Both of the units contain independent controls for the meat moving element, whether it be the conveyor itself or the roller, and for the associated brushes, the brushes themselves being adjustable so as to vary the degree of engagement with the meat. The various components of the machine, including the brushes and roller, are easily removed for cleaning or replacement purposes. In addition, the entire roller unit is spring-mounted for a load reducing support in a manner which allows the roller to easily rise for the accommodation of thicknesses of meat moved thereunder by the conveyor. Finally, both the conveyor and the roller incorporate blade-type meat gripping members which effect a positive engagement with the meat for movement thereof along the cleaning path.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the automatic meat cleaning apparatus comprising the instant invention;

FIGURE 2 is a partial perspective view of the support base or table;

FIGURE 3 is an enlarged cross-sectional view taken substantially upon a plane passing along line 3—3 in FIGURE 2;

FIGURE 4 is a horizontal view of the conveyor unit taken substantially on a plane passing along line 4—4 in FIGURE 3;

FIGURE 5 is a vertical cross-sectional view taken substantially on a plane passing along line 5—5 of FIGURE 3;

FIGURE 6 is a rear elevational view, with portions broken away, of that portion of the machine shown in FIGURE 5;

FIGURE 7 is a cross-sectional detail taken substantially on a plane passing along line 7—7 in FIGURE 6;

FIGURE 8 is a cross-sectional detail taken substantially on a plane passing along line 8—8 in FIGURE 6;

FIGURE 9 is a cross-sectional detail taken substantially on a plane passing along line 9—9 in FIGURE 6;

FIGURE 10 is an enlarged cross-sectional detail illustrating the inner mounted end of the meat engaging and moving roller;

FIGURE 11 is an exploded elevational detail of a slightly modified form of roller and the associated mounting structure;

FIGURE 12 is an enlarged exploded perspective detail of the blade-like construction of the conveyor;

FIGURE 13 is an exploded view of a modified conveyor construction;

FIGURE 14 is a perspective view of one form of meat cleaning brush;

FIGURE 15 is an enlarged cross-sectional view through the brush of FIGURE 14 mounted in operative position;

FIGURE 16 is an enlarged cross-sectional view detailing the motor engaging end of the conveyor drive shaft; and FIGURE 17 is an enlarged cross-sectional detail taken substantially on the plane passing along line 17—17 in FIGURE 4 illustrating the conveyor tensioning means.

Referring now more specifically to the drawings, reference numeral 20 is used to designate the automatic meat cleaning apparatus comprising the instant invention. This apparatus consists of three major portions, an enlarged mounting base or table 22, an elongated horizontally orientated conveyor unit 24, and an upper roller unit 26 orientated across a predetermined portion of the conveyor unit for cooperation therewith in moving and cleaning a cut of meat.

The support base 22 includes an elongated horizontally orientated platform or table top 28 which is in turn supported on a cabinet-type unit 30, the interior of which is accessible through a pair of enlarged front doors 32 for the selective introduction and removal of an enlarged scrap tray or container 34, this container 34 being partially illustrated in cross-section in FIGURE 3. The top 28 includes an enlarged opening 36 therein surrounded by relatively short inwardly converging flanges 38 which assist in inwardly directing the brushed scrap for discharge into the subjacent scrap container 34. This opening 36 generally underlies the meat cleaning portion of the conveyor unit 24 and roller unit 26 as will also be appreciated from FIGURE 3. Finally, the support base 22 includes an elongated upstanding rear wall 40 provided so as to assist in the proper positioning of the conveyor unit 24 on the top 28 and also so as to mount the various drive means for the components of the conveyor unit 24.

The conveyor unit 24 itself is removably mountable on the base unit 22 and is in fact a self-contained unit which can be removed for cleaning purposes or the like, such as for example by a dipping of the entire conveyor unit into a vat or basin. Basically, the conveyor unit 24 includes an elongated mounting frame 42 comprising front and rear substantially duplicate walls 44 and 46 interconnected by transversely extending wall bracing bars or members 48. Each of the walls 44 and 46, as will be best appreciated from FIGURE 3 wherein the rear wall 46 is illustrated in elevation, includes, as an integral unit, flat front and rear panels 50 and 52 interconnected by full length horizontally extending upper and lower bars 54 and 56, these upper and lower horizontal bars 54 and 56 in turn being interconnected by vertical braces 58 to which the transverse braces or members 48 are affixed. Thus, each of the walls 44 and 46 in fact have large portions thereof removed, resulting in a substantial weight reduction without any substantial reduction in the structural stability of the frame due to the particular arrangement of the bracing members.

A transverse drive shaft 60 is rotatably mounted between the opposed front panels 50 of the frame walls 44 and 46 with this shaft 60 projecting laterally beyond the rear wall 46 and terminating in a polygonal mounting head 62, noting particularly FIGURE 16. This shaft mounts, immediately inward of each of the opposed frame walls 44 and 46, a pair of drive sprockets 64, the two sprockets 64 being fixed to the shaft 60 for rotation therewith. If deemed necessary, appropriate collars 66 can be provided on the shaft so as to fix the shaft against longitudinal movement through the bearing supports therefor, while at the same time allowing for a free rotational movement thereof. The polygonal coupling head 62 is particularly designed for reception within a mating socket 68 provided on the inner end of a drive shaft 70 which projects through the vertical rear wall 40 of the base 22. This shaft 70 is driven from an appropriate motor 72 through a gear box 74, both of which are mounted on the rear face of the base wall 40 as will be seen in FIGURE 4. A second elongated conveyor shaft 76 extends transversely between the rear panels 52 of the front and rear frame walls 44 and 46 and has the opposite ends thereof supported within a pair of bearing blocks 78. With reference to FIGURES 4 and 17, each of the bearing blocks 78 is threadedly mounted on a pair of position adjusting bolts 80 which are in turn rotatably mounted within a pair of lugs or ears 82 rigidly affixed to the end of the corresponding wall 44 or 46 whereby upon an adjustment of the opposed bearing blocks 78 through a manipulation of the pair of bolts 80 associated with each block 78, the conveyor shaft 76 can be shifted longitudinally between the conveyor frame walls 44 and 46. Incidentally, it will be noted that the walls 44 and 46 are provided with longitudinal slots 84 therein so as to slidably accommodate the extreme opposed ends of the shaft 76 which will project beyond the two bearing blocks 78 thus providing an additional degree of stability to the shaft 76 without interfering with the longitudinal adjustment thereof through the adjusting bolts 80 or the free rotation thereof in response to the driven rotation of the shaft 60 as shall be explained presently.

The shaft 76, as in the case with the shaft 60, mounts a pair of enlarged sprockets 86 immediately inward of the two bearing blocks 78 for rotation with the shaft 76 through a pair of endless elongated drive chains 88 engaged or trained about the sprockets 64 and 86. The drive chains 88 parallel each other adjacent the opposed frame walls 44 and 46 for the full length of the conveyor unit 24 and mount the actual body of the conveyor therebetween for movement therewith in response to a powered rotation of the drive shaft 60. The body of the conveyor consists of a plurality of endless laterally spaced parallel blade or gripping rod units 90 defined in each instance by a series of pivotally interconnected blade sections 92.

With reference to FIGURES 4 and 12 in particular, it will be appreciated that each blade section 92 includes one offset end 94 so as to overlap the opposite end of adjacent blade section 92 with the blade sections, aside from the overlapping offset end 94, being substantially coplanar. The overlapped end portions of the adjacent blade sections 92 are apertured and are rotatably received on a transversely extending elongated shaft 96. These shafts 96, one used to pivotally interconnect each pair of adjoining blade sections, extend transversely between the opposed conveyor chains 88, mounting all of the laterally spaced blade units 90 positioned therebetween. The blade units 90 are maintained in the desired laterally spaced relation relative to each other by appropriate spacers or spacing sleeves 98 mounted on the shafts 96 between each of the blade units 90 as well as between the endmost blade unit and the adjoining chain 88. The opposite ends of each of the rods 96 are in turn fixed to selected opposed pairs of links 100 on the opposed drive chains 88. These shaft mounting links 100 can be formed as best seen in FIGURE 12 with an upstanding apertured ear for the reception of the corresponding shaft 96 therethrough. The shafts 96 are preferably removably mounted so as to simplify a changing of the blade sections 92 should such be required. Thus, the shafts 96 can be provided with an enlarged head 102 at one end thereof and a nut receiving threaded end 104 at the opposite end.

Each of the blade sections 92 is flat, vertically orientated and of a relatively substantial depth with parallel straight upper and lower edges 106 and 108. The upper edge 106 of each of the blade sections 92 is provided with a plurality of upwardly projecting relatively low height gripping teeth 110 which effect a positive engagement with a cut of meat for a movement of the meat in a non-slipping manner along with the movement of the conveyor. These teeth 104 are of a height so as to firmly grip the meat without any damage to the meat. The straight lower edges 108 of the blade sections 92, along the upper run of the conveyor, either ride directly on or pass over in slightly raised relation to a plurality of transversely extending rotatably mounted rollers 112, the opposite ends of which are mounted rotatably within bearings 114 provided within the opposed upper bars 54 of the front and rear frame walls 44 and 46. These rollers 112, spaced along the top of the conveyor unit 24 immediately below the top run of the blade units 90 as best seen in FIGURES 3 and 4, act as load or shock compensating means so as to insure a proper support of the meat on the upper or working run of the conveyor. In other words, any tendency for the upper run of the conveyor to deflect beyond a desirable point will bring this upper run into rolling engagement with the support rollers 112. Incidentally, it will of course be appreciated that the tension on the conveyor can be adjusted through a movement of the rear conveyor shaft 76 as described in connection with FIGURE 17.

With reference to FIGURE 13, a modified form of blade section 116 has been illustrated therein in conjunction with a slightly modified manner of mounting the blade sections. The sections 116 also of course include meat gripping teeth 118 along the straight upper edges thereof, and are similarly provided with straight lower edges 120 which are adapted for rolling engagement with the underlying support rollers 112. The blade sections 116 primarily differ from the blade sections 92 in that the sections 116 do not include offset end portions and are arcuately formed at the opposed ends thereof, between the raised rod receiving mounting ears 122 and the lower edges 120. The actual mounting of the blade sections 116 will be readily apparent from FIGURE 13, and consists basically of the pivot forming shaft 96 extending through aligned apertures 124 in the blade section ears 122 with the sleeve-like spacers 126 being positioned in between each pair of blade sections 116 so as to provide a staggered effect along the length of the conveyor thereby, under certain circumstances, possibly enhancing the supporting ability of the conveyor. Incidently, as will be appreciated from FIGURE 3, the length of the individual blade sections whether 92 or 116, is to be such so as to enable a proper movement of the sections about the conveyor shafts 60 and 76.

Referring to FIGURE 1, the conveyor unit 24 is provided with a horizontal plate or panel 128 which spans the forward end of the conveyor and acts as a rest or support for the meat being introduced onto the conveyor, as well as a cover and protective means for the meat receiving end of the conveyor so as to insure a proper introduction of the meat onto the conveyor. Further, an elongated finishing panel 130 is provided in overlying relation to the front conveyor frame wall 44 so as to provide a protective enclosure for the front wall openings and a finished appearance to the machine 20. This front cover 130 or the adjacent front frame wall 44, includes an inwardly projected full length protective flange or lip 132 which overlies the adjacent conveyor chain 88 and provides a protective cover therefor. A similarly inwardly directed full length flange or lip 134 is provided on the rear frame wall 46 and overlies the conveyor chain 88 immediately adjacent thereto.

The conveyor unit 24 is mounted on the table top or support platform 28 by being slid rearwardly thereon so as to engage a guide lug 136 on the rear frame wall 46 into a guide hole or aperture 138 in the rear wall 40 along the lower edge portion thereof. In addition, the projecting polygonal male end 62 of the drive shaft 60 of the conveyor is slidably received within a complementarily configured socket 68 extending from the gear box 74 associated with the conveyor driving motor 72. Finally, the conveyor unit 24 is locked in position by a pair of positioning pins or spikes 140 which extend through apertured ears 142 projecting forwardly from the lower edge of the front frame wall 44 and complementary holes 144 in the support platform 28 immediately therebelow. The cover plate 130 is of course notched so as to enable the projection of the ears 142 therethrough, and, for matters of convenience, the pins 140 may be tethered to the platform 28. Thus, it will be appreciated that the removal of the conveyor unit 24 only involves a lifting of the pins 140 out of the aligned apertures provided therefor and a forward shifting of the conveyor unit 24 so as to disengage the positioning lug 136 and the forward conveyor shaft 60. In order to facilitate the actual handling of the conveyor unit 24, one or more hand-holds 146 can be provided through the cover plate or panel 130.

The actual cleaning of the face of the meat directly engaged with the conveyor is effected by a rotatably mounted brush unit 148 which is positionable transversely across the conveyor unit 24 immediately below the upper run of the conveyor in overlying relation to the platform scrap opening 36 as best illustrated in FIGURE 3. The brush unit 148, utilizing the particular embodiment of FIGURES 14 and 15 as example, consists of an elongated shaft 150 having an enlarged internally threaded socketed head 152 at one end thereof which threadedly engages the reduced threaded projecting end 154 of a brush drive shaft 156 extending through a vertical arcuate slot 158 in the vertical table wall 40. The brush shaft 150 receives an elongated bristle mounting sleeve 160 which is keyed to the shaft 150 by appropriate keying means 162 and is releasably maintained on the shaft 150 by suitable spring-biased ball detent means 164 on the far end of the shaft 150 from the socketed head 152. The bristles of the brush itself can be either spirally arranged as suggested in FIGURES 5 and 8, or can, as is preferred, be formed of a series of flexible nylon flaps 166 which extend the full length of the sleeve 160 and are provided with outer edges formed with a series of slits therein so as to produce individual cleaning fingers 168. These fingers 168, in conjunction with the flexible nature of the flaps 166 themselves, provide a combination scraping and flipping action when engaged with the meat. In addition, as will be appreciated from FIGURE 15, the flaps or flexible panels 166 are also provided with spaced grooves 170 which correspond with the placement of the blade units and provide for an accommodation thereof without an adverse or detracting bending of the cleaning flaps 166. The brush unit 148 is mounted directly through an opening provided in the front cover panel 130 selectively closed by a pivotally mounted door or closure panel 172 with the engagement of the brushes 148 with the brush drive shaft 156 being such so as to properly position and rotatably drive the brush unit 148 notwithstanding the unsupported opposite end of the brush unit 148. If necessary to facilitate the mounting and removal of the brush unit 148 from the shaft 156, appropriate wrench receiving holes or portions can be provided on the brush shaft head 152 and the drive shaft 156. The brush drive shaft 156 extends through the arcuate slots 158 and is drivingly engaged with an appropriate variable speed motor 174 through a motor mounted gear box 176. Both the gear box 176 and the motor 174 are secured to a mounting plate 178 which overlies the rear face of the vertical table wall 40, extends in a horizontal direction, and is pivotally mounted for movement in a vertical plane by appropriate pivot means 180. The plate 178 extends beyond the gear box or unit 176 and terminates in an arcuate end portion 182 which is slidably retained against the rear face of the wall 40 by a vertically elongated bracket 184 of sufficient height so as to allow for a pivotal movement of the plate 178 and hence a corresponding vertical adjustment of the brush unit 148 so as to vary the degree of projection of the brush bristles through the upper run of the conveyor which in turn varies the degree of engagement with the meat. The actual adjustment of the mounting plate 178 is provided for by an internally threaded sleeve 186 which, through a projecting stud 188 received within an elongated slot 190, is attached to the plate 178. The internally threaded sleeve 186 threadedly receives a vertically elongated adjusting rod or bolt 192 which includes an enlarged manipulating handle 194 at the upper end thereof and is rotatably mounted and retained against longitudinal movement by appropriate bracket means 196 on the wall 40. The stability of the threaded shaft 192 assists in positively retaining the sleeve lug 188 within the elongated slot 190 with the elongated slot 190 allowing for a slight shifting of the internally threaded sleeve 186 as the shaft 192 is rotated through a manipulation of the handle 194 so as to pivot the mounting plate 178 and hence vertically adjust the meat cleaning brush unit 148.

Referring now specifically to the roller unit 26, reference numeral 200 is used to generally designate the stable combination housing and support frame thereof. This housing 200 includes, along the path of movement of the conveyor, an open front wall 202, and a closed rear wall 204, as well as a covering top wall 206 and an open bottom. In addition, the housing 200 is provided with front and rear mounting walls 208 and 210 when viewed from the front of the machine as it appears in FIGURE 1. An access door 212 is provided in the top wall or cover 206 to enable entry into the interior of the housing 200 for any purpose. By the same token, an enlarged access panel 214 is mounted on the front mounting wall 208 by enlarged hand manipulatable mounting bolts 216 which allow this panel 214 to be quickly mounted or removed. In addition, the access panel 214 includes a pivotally mounted door 218 therein which allows access to the interior of the meat handling roller 220, as well as the internal brush unit 222, without removing the entire panel 214 which incidently constitutes a portion of the mounting structure for the roller 220 as shall be described subsequently.

The roller 220 consists of a pair of annular end collars 224 which mount the opposed ends of a series of circumferentially spaced stabilizing rods 226. These rods 226 in turn are rigidly affixed to and mount annular or ring-like meat gripping blades 228 which in turn may be provided with peripherally spaced outwardly projecting meat gripping teeth 230. As an alternative to this construction, attention is directed to FIGURE 11 wherein the roller blades have been illustrated as in fact consists of a plurality of blade sections 232, each having an offset end 234 for an alignment of the sections 232 which constitute a single ring. Further, the mounting of the blade sections 232 will be affected by elongated rods 236 having section spacing spacers or sleeves 238 thereon, the rods 236 being releasably mounted within opposed lugs or ears 240 provided on the opposed collars 224, thus closely approaching the conveyor construction of FIGURE 12.

The rear or inner mounting wall 210 mounts a ball bearing unit 242 within an annular groove 244 provided therefor. The unit 242 includes a projecting collar or sleeve-like rotating portion 246 which has a ring gear track 248 fixed peripherally thereabout in spaced relation to the inside face of the wall 210, and a series of mounting lugs 250 fixed about the innermost free edge thereof. The corresponding or innermost roller collar 224 is in turn provided with edge notches or recesses 252 which receive the projecting studs 254 provided on the lugs 250 so as to result in a locking of the collar 220 to the bearing collar 246 for rotation therewith. The collar 224 on the opposite end of the roller 220 is similarly locked to a bearing unit 242 mounted on the removably front panel 214. Thus, when it is desired to mount the roller 220, the front panel 214 is removed, the roller 220 introduced into the housing 200 in a manner so as to engage the recesses 252 of the innermost collar 224 with the mounting studs 254, after which the panel 214 is mounted in a manner so as to align the collar recess 252 of the front collar 224 with the studs 254 of the bearing unit 242 associated with the panel 214. Once the panel 214 is mounted, the roller 220 is secured for rotation between the mounting walls 208 and 210 and cannot be removed or displaced until the front panel 214 is removed. Incidently, in order to facilitate mounting of the front panel 214, a positioning lug 256 can be provided thereon for engagement with an appropriate aligning hole 258 in the front wall 208.

The driving of the roller 220 is effected through a drive gear 260 drivingly engaged with the ring gear track 248 and mounted on a drive shaft 262 projecting through the rear mounting wall 212 and drivingly engaged with an appropriate motor 264 through a gear box or unit 266, the motor and gear box being mounted on the rear face of the wall 210. Further, if so desired, a similar drive gear can be engaged with a gear track provided on the front bearing unit 242 with the drive shaft 262 extending transversely across the housing 200 for driving engagement therewith, this use of two drive gears 260 possibly achieving a more stable rotational driving of the roller 220 should such be considered necessary.

The brush unit 222 associated with the roller unit 26 is received through the roller 220 and positioned in a manner so as to allow the cleaning bristles thereon, whether as illustrated in FIGURE 5 or as illustrated in FIGURE 14, to project between and beyond the blades for a surface cleaning engagement with the meat. This roller unit 222 is removably mounted, in the same manner as the roller unit 148, on the inwardly projecting end 268 of a drive shaft associated with a variable speed motor 270 through an appropriate gear box or unit 272. The motor 270 and gear box 272 are both mounted on a mounting plate 274 which in turn is received between a pair of opposed vertical tracks 276 for vertical sliding adjustment on the rear face of the rear mounting wall 210. This vertical adjustment is so as to vary the position of the brush unit 222, the drive shaft 268 therefore projecting through a vertically elongated slot 278 provided in the rear mounting wall 210. The actual vertical adjustment of the mounting plate 274 and hence the brush unit 222 is effected through a vertically elongated threaded shaft or rod 280 which is rotatably mounted within a bearing block or bracket 282 fixed to the rear wall 210. The shaft 280 is of course mounted within the bracket for solely rotational movement and is, through appropriate collar or lock ring means, fixed against longitudinal movement. The threaded lower portion of the shaft 280 is received within an internally threaded block 284 fixed to the plate 274. Thus, as the shaft 280 is rotated through an appropriate control handle 286, a vertical shifting of the block 284, and consequently the mounting plate 274 will be effected.

From the foregoing, it will be appreciated that the roller unit 26 is in fact a self-contained unit. The mounting of this unit 26 over the conveyor unit 24 so as to provide for a substantially vertical alignment of the brush units 148 and 222, as will be noted in FIGURE 3, is effected through a plurality of spring-loaded mounts 288. Attention is specifically directed to FIGURE 6 wherein one such mount 288 has been detailed. Each mount 288 includes a closed bottom hollow upwardly opening sleeve or pipe 290 fixed to any appropriate portion of the conveyor unit 24, such as for example the cover plate 130 as illustrated in FIGURE 1, or to the vertical table wall 40 as illustrated in FIGURE 6. This sleeve 290 receives a vertically projecting support shaft or rod 292, the lower end thereof which is provided with a friction reducing bushing 294 and rests on and is spring-biased upwardly by an expanded coiled compression spring 296. The rod 292 extends through a retaining cap 298 and a bushing 300 closing the upper end of the pipe 290 and projects a substantial distance vertically thereabove for telescopic reception within a downwardly opening closed end pipe or tube 302 mounted on the roller unit housing 200. The spring loads of the combined mounts or mounting units 288 are sufficient so as to retain the roller unit 226 in spaced elevated position over the conveyor and act so as to counterbalance or reduce the effective weight of the roller unit 26 whereby a relatively free upwardly movement of the roller unit can be effected upon the encountering, by the roller 220 itself, of a greater than normal thickness slab or cut of meat. By the same token, when cleaning large sections of meat, such as quarters, the roller unit 26 can be merely lifted completely from the machine 20, in which instance only the lower face of the section of meat will be cleaned with the weight of the section itself holding the meat down for positive engagement by the lower cleaning brush.

In actual use, a cut of meat is put on the conveyor and moved along thereby through the open forward wall 202 of the roller unit 26. The roller 220 within the roller unit 26, being rotatably driven, engages the conveyed cut of meat and in cooperation with the continuously moving conveyor, moves the cut of meat in a positive manner through the oppositely rotating upper and lower cleaning brushes which engage and clean the opposed faces of the meat. Upon an engagement of the roller 220 with the meat, the roller unit 26 will adjust itself accordingly and retain the roller 220 in positive gripping engagement with the meat. Incidentally, it will be appreciated that the height of the back wall 204 will be such so as to accommodate any thickness cut of meat which will necessarily have to pass thereunder. With reference to FIGURE 3, as will be appreciated from the direction arrows, the brushes will driect any brushed scraps toward the direction from which the meat is intoduced thereto. As such, a pair of flexible scrap deflecting panels 304 are hung both between the conveyor frame walls 44 and 46 and between the roller housing walls 208 and 210. Such panels 304 can be suspended by providing a support rod 306 along the upper edge of each with the opposite ends of the rods 306 being seated within U-shaped brackets 308 on the opposed walls. In this manner, the deflecting panels or flaps 304 can also be quickly removed for cleaning or replacement purposes. Further, while not illustrated, a scraping rod can be mounted and associated with each brush for an engagement of the outer ends of the bristles therewith subsequent to engagement of the bristles with the meat to scrape or flip the bone dust and fat from the bristles.

An appropriate control panel 310 will be provided at any convenient location on the front of the apparatus 20. It is contemplated that the roller and conveyor motors be operated from a single switch and synchronized so as to cooperate in a positive feeding of the meat past the cleaning brushes. By the same token, the rotational driving of the brushes is also to be synchronized. However, with regard to the driving of the brushes, it is contemplated that the control 312 therefor be such so as to enable a variation in the rotational speed of the brushes so as to accommodate different types of meat, such as beef, veal, lamb or pork, whereby the best speed for most effectively cleaning the particular type of meat involved can be achieved.

From the foregoing, it should be appreciated that a highly unique meat cleaning device has been defined. This device, upon having a piece of meat positioned thereon, automatically moves the meat along a predetermined path and effectively engages the moving meat, on one or two sides thereof, by power driven rotating brushes so as to effect a cleaning of bone dust, marrow, fat or the like therefrom. The machine is constructed of separable components, including a conveyor unit and a conveyor overlying roller unit, the conveyor unit being used either in conjunction with the roller unit for the cleaning of opposed faces of a cut of meat, or usable alone in effecting the cleaning of only one face of a cut or section of meat. The scraps brushed or scrapd from the meat are discharged into a subjacent cleanout tray or container and the cleaned meat moved by the conveyor beyond the cleaning portion of the apparatus to a spaced discharge point where an appropriate meat receiving lug can be positioned. The machine provides effective means for adjusting the degree of engagement of the cleaning brushes with the meat, as well as means for compensating for the weight of the overlying unit in a manner whereby an accommodation of different thickness of cuts of meats is possible while still maintaining proper gripping engagement on the meat for a positive movement of the meat by the cleaning brushes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A meat cleaning machine for receiving and automatically cleaning a cut of meat, said machine including a support structure, meat gripping and moving means movably mounted on said structure for engaging a cut of meat and moving the meat along a specific path through said structure, and means mounted on said structure for engaging and cleaning the meat as it is moved along the path, said gripping and moving means comprising a pair of opposed gripping members in facing relation to each other on opposite sides of said path, the facing portions of said gripping members being movable in a common direction along said path, said cleaning means comprising a pair of cleaning members mounted outward of the facing portions of said gripping members while projecting inward thereof into said path, and means for adjusting the amount of projection of said cleaning members into said path, one of said gripping members comprising an endless conveyor defined by a plurality of laterally spaced elongated blade-like elements.

2. The apparatus of claim 1 wherein the second of said gripping members comprises a cylindrical roller defined by a plurality of laterally spaced blade-like rings, said roller being positioned transversely across said conveyor.

3. The apparatus of claim 2 wherein said conveyor is horizontally orientated, and means for adjustably mounting said roller in overlying relation to said conveyor for selective movement in a vertical direction relative thereto in response to the movement of meat between the rollers and the conveyor.

4. The apparatus of claim 3 including a support base, said support base including a flat support platform, said conveyor being positioned on said platform and selectively removable therefrom as a unit.

5. The apparatus of claim 4 wherein said roller is removably mounted for removal from overlying relation to said conveyor and thereby providing an unencumbered area above said conveyor along the full length thereof, the cleaning members associated with said conveyor and said roller being removable therewith as well as independently thereof.

6. Meat cleaning apparatus comprising a horizontally orientated elongated conveyor unit, said conveyor unit comprising an endless conveyor and means mounting said conveyor for continuous travelling movement in a manner so as to transport a piece of meat to be cleaned therealong, said conveyor being defined by an open body formed of a plurality of spaced meat gripping thin blade-like members, said conveyor being arranged with upper and lower conveyor runs, and an elongated rotatably mounted brush-like cleaning member positioned beneath the upper run of said conveyor and engageable with a piece of meat therethrough as the upper run moves the meat across said brush-like member, a meat gripping roller unit, and means removably mounting said roller unit over the upper run of said conveyor, said roller unit including an elongated open body roller positioned transversely across the upper run of said conveyor in vertically spaced relation thereabove and in generally vertical alignment with the brush-like cleaning member associated with the conveyor, said roller comprising an open body defined by a plurality of spaced meat gripping blade-like members, and a second brush-like cleaning member extending longitudinally through said roller and rotatably mounted therein for selective engagement with a piece of meat through the open body of said roller, said second brush-like cleaning member paralleling and being located in generally opposed relation to the first mentioned brush-like cleaning member.

7. The apparatus of claim 6 including a support base, and means removably mounting said conveyor unit on said support base, said support base including a flat horizontally orientated platform receiving said conveyor unit, said platform defining an enlarged central opening underlying said conveyor unit in general alignment with said roller unit for the reception of scraps or the like therethrough.

8. The apparatus of claim 7 wherein said base includes a conveyor driving motor unit mounted thereon, said conveyor unit including a conveyor drive shaft projecting laterally therefrom and selectively engageable with the motor unit upon mounting of the conveyor unit on the base.

9. The apparatus of claim 6 wherein the blade-like members of the conveyor and the roller comprise individual blade sections interconnected at the adjoining ends thereof by transversely extending mounting rods.

10. The apparatus of claim 6 wherein at least one of said brush-like cleaning members includes an elongated shaft having a plurality of full length flexible flaps secured thereto and projecting radially outward therefrom at circumferentially spaced points, said flaps having the outer edges thereof slit so as to provide flexible cleaning fingers engageable with the meat.

11. The apparatus of claim 10 including means for varying the position of the first-mentioned brush-like cleaning member relative to the upper run of the conveyor for varying the degree of engagement with a piece of meat.

12. An automatic meat cleaning machine for receiving and cleaning a cut of meat, said machine including a pair of opposed cleaning units, a base unit, and means for mounting said opposed units on said base unit, enlarged endless open network meat gripping and moving means mounted within each cleaning unit for travel in a path to grip and convey meat therebetween, said meat gripping and moving means being orientated in generally opposed relation to each other, means for moving said gripping and moving means in opposed paths, and means positioned within each gripping and moving means for engaging and cleaning the opposite sides of a cut of meat moved thereby, one of said gripping and moving means comprising an elongated horizontally orientated conveyor, the second of said gripping and moving means comprising a generally cylindrical rotatable roller orientated above and transversely across said conveyor.

13. The apparatus of claim 12 including mounting means mounting said roller over said conveyor, said mounting means being spring-loaded and counteracting at least a substantial portion of the weight of the roller for facilitating a meat induced movement of the roller upward relative to the conveyor.

14. A meat cleaning machine for receiving and automatically cleaning a cut of meat, said machine including a support structure, meat gripping and moving means movably mounted on said structure for engaging a cut of meat and moving the meat along a specific path through said structure, and means mounted on said structure for engaging and cleaning the meat as it is moved along the path, said gripping and moving means comprising a pair of opposed open-network gripping members in facing relation to each other on opposite sides of said path, the facing portions of said gripping members being movable in a common direction along said path, said cleaning means comprising a pair of cleaning members mounted outward of the facing portions of said gripping members while projecting inward thereof into said path, one of said gripping members comprising an endless conveyor, the second of said gripping members comprising a cylindrical rotatable roller orientated laterally of and transversely across said conveyor, said conveyor and said roller each being defined by a plurality of spaced interconnected thin members forming an open-network for effecting a non-compacting positive gripping of a cut of meat engaged between the conveyor and the roller.

15. The apparatus of claim 14 wherein said spaced interconnected thin members defining the roller comprise a plurality of coaxial laterally spaced annular blade units along the length of the roller, and a plurality of circumferentially spaced rod units extending longitudinally along the roller and interconnecting the blade units, said spaced interconnected thin members defining the conveyor comprising a plurality of spaced endless blade units extending longitudinally along the conveyor, and a plurality of transversely extending spaced rod units interconnecting the conveyor blade units.

References Cited

UNITED STATES PATENTS

| | | | |
|---|---|---|---|
| 554,707 | 2/1896 | Michner | 15—3.17 |
| 1,670,809 | 5/1928 | Hormel | 15—3.17 |
| 2,817,862 | 12/1957 | Frazho et al. | 15—230.16 |

FOREIGN PATENTS

| | | |
|---|---|---|
| 308,543 | 3/1929 | Great Britain. |
| 958,808 | 5/1964 | Great Britain. |

EDWARD L. ROBERTS, Primary Examiner

U.S. Cl. X.R.

15—77